US009734731B2

(12) United States Patent
Van Hees et al.

(10) Patent No.: US 9,734,731 B2
(45) Date of Patent: Aug. 15, 2017

(54) BRAILLE DISPLAY

(75) Inventors: Lukas Wilhelmus Van Hees, Voorburg (NL); Maarten Van Egmond, Rijnsburg (NL)

(73) Assignee: OPTELEC DEVELOPMENT B.V., Barendrecht (NL)

( * ) Notice: Subject to any disclaimer, the term of this patent is extended or adjusted under 35 U.S.C. 154(b) by 1002 days.

(21) Appl. No.: 12/937,789

(22) PCT Filed: Apr. 14, 2008

(86) PCT No.: PCT/NL2008/050208
§ 371 (c)(1),
(2), (4) Date: Nov. 19, 2010

(87) PCT Pub. No.: WO2009/128700
PCT Pub. Date: Oct. 22, 2009

(65) Prior Publication Data
US 2011/0057921 A1 Mar. 10, 2011

(51) Int. Cl.
*G09B 21/00* (2006.01)
*G09B 21/02* (2006.01)
(52) U.S. Cl.
CPC .......... *G09B 21/004* (2013.01); *G09B 21/00* (2013.01); *G09B 21/003* (2013.01); *G09B 21/02* (2013.01)
(58) Field of Classification Search
USPC ........................................ 434/113
See application file for complete search history.

(56) References Cited

U.S. PATENT DOCUMENTS 3,885,837 A * 5/1975 Mellor ................... B65G 21/22
198/841
4,758,165 A * 7/1988 Tieman et al. ............... 434/114
(Continued)

FOREIGN PATENT DOCUMENTS

EP 0 620 541 A 10/2004

OTHER PUBLICATIONS

International Search Report regarding PCT/NL2008/050208.

Primary Examiner — James Hull
(74) Attorney, Agent, or Firm — Husch Blackwell LLP

(57) ABSTRACT

A braille display comprising an outer wall comprising an outer surface, an inner surface and a plurality of holes extending between the outer surface and the inner surface and which are arranged in an at least substantially regular pattern relative to each other. The braille display is further provided with braille cells wherein each braille cell comprises at least one tactile member which is movable between a first outer position and second outer position and activations means for moving the at least one tactile member between the first and second outer position. The at least one tactile member comprises a free top and each braille cell is located near the inner surface of the tactile member wherein each tactile member extends through one of the holes from the inner surface in a direction of the outer surface, at least if the tactile member is in the second position and wherein a position of the free top of the tactile member relative to the outer surface when the tactile member is in its first position differs from the position of the free top of the tactical member relative to the outer surface when the tactile member is in its second position, wherein each braille cell of a group of the braille cells is attached to the outer wall by means of a connection which acts on the one hand on the (Continued)

braille cell and on the other hand on the outer wall at a location adjacent to the braille cell.

25 Claims, 8 Drawing Sheets

(56) References Cited

U.S. PATENT DOCUMENTS

| | | | |
|---|---|---|---|
| 5,226,817 A * | 7/1993 | Nakajima | G09B 21/004 434/112 |
| 5,227,631 A * | 7/1993 | Hunter et al. | 250/352 |
| 5,396,404 A * | 3/1995 | Murphy et al. | 361/719 |
| 5,685,720 A * | 11/1997 | Kashi | 434/114 |
| 5,766,014 A | 6/1998 | Ida et al. | |
| 6,109,922 A | 8/2000 | Litschel et al. | |
| 6,417,821 B1 | 7/2002 | Becker et al. | |
| 7,462,034 B1 * | 12/2008 | Murphy et al. | 434/112 |
| 2004/0083683 A1 * | 5/2004 | Russell | 53/397 |
| 2004/0197745 A1 * | 10/2004 | Hong | G09B 21/004 434/113 |
| 2005/0069842 A1 | 3/2005 | Schleppenbach | |
| 2009/0011391 A1 * | 1/2009 | Van Hees et al. | 434/114 |

* cited by examiner

Detail A

Detail B

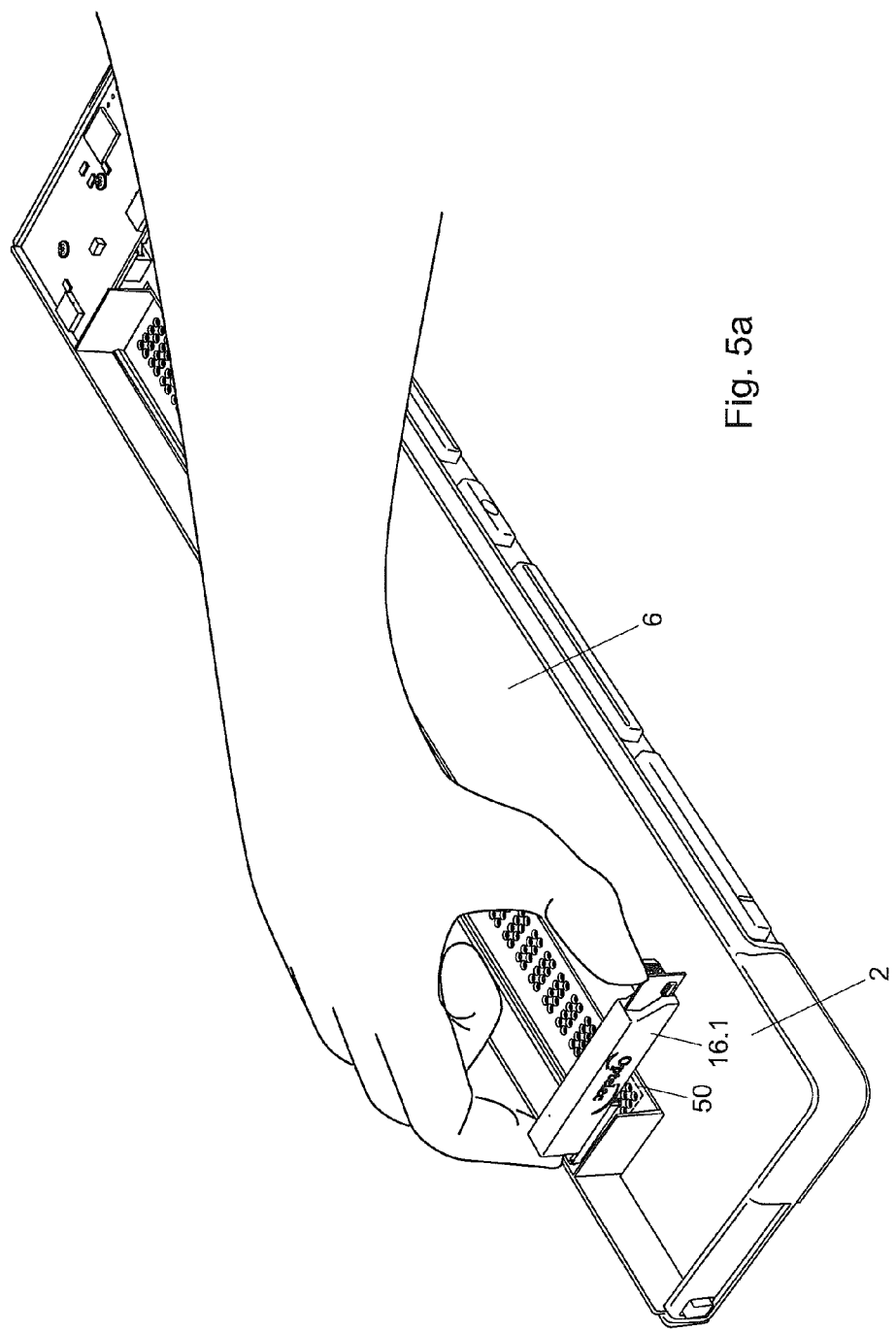

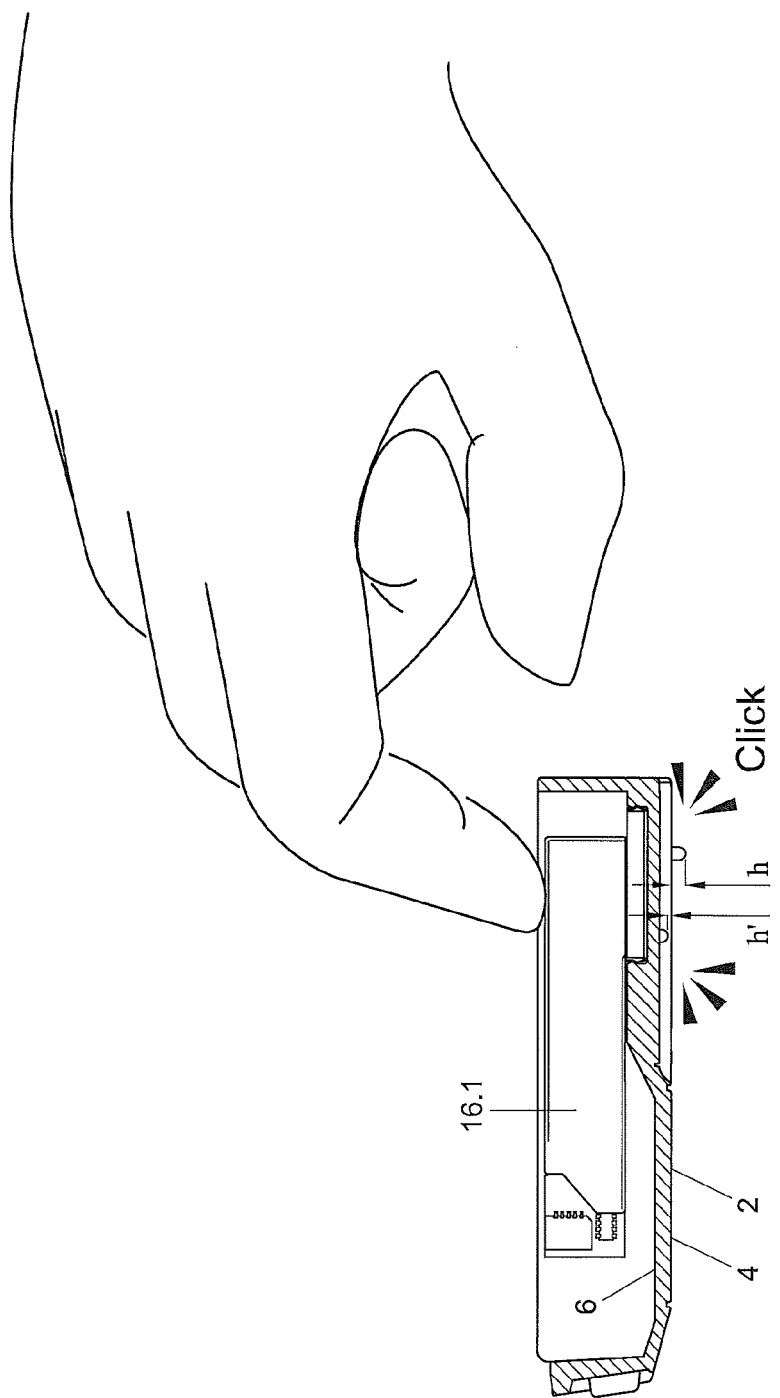

BRAILLE DISPLAY

The invention relates to a braille display comprising an outer wall comprising an outer surface, an inner surface and a plurality of holes extending between the outer surface and the inner surface and which are arranged in a at least substantially regular pattern relative to each other wherein the braille display is further provided with braille cells wherein each braille cell comprises at least one tactile member which is movable between a first outer position and second outer position and activations means for moving the at least one tactile member between the first and second outer position wherein the at least one tactile member comprises a free top and wherein each braille cell is located near the inner surface of the tactile member wherein each tactile member extends through one of the holes from the inner surface in a direction of the outer surface, at least if the tactile member is in the second position and wherein a position of the free top of the tactile member relative to the outer surface when the tactile member is in its first position differs from the position of the free top of the tactical member relative to the outer surface when the tactile member is in its second position.

Such a braille display is generally known. A known braille display is provided with a housing which basically comprises a bottom wall, a top wall and an upstanding sidewall which are assembled together. The top wall forms the outer wall which is provided with the plurality of holes. The braille cells are connected to each other to form an array of braille cells. For connecting these braille cells each braille cell is provided with at least a first and a second opening. A first threaded end is passed through each of the first openings and the braille cells are pressed against each other side by side by subsequently screwing a nut to the free end of the first threaded end. A second threaded end is passed through each of the second openings and the braille cells are pressed against each other side by side by subsequently screwing a nut to the free end of the second threaded end. The array of Braille cells is subsequently fixed to the bottom wall. The top wall and the bottom wall are fixed relative to each other by means of the upstanding side walls which are connected to the top wall and the bottom wall respectively.

A disadvantage of the known braille display is that the braille cells have to provided with the first and second opening. This makes the braille relatively voluminous. Furthermore, because of tolerances on the individual braille cells it is necessary to divide the top surface (the reading surface) into a number of separate parts. I.e. for a 40 cell braille reader, the top surface with the plurality of holes is usually divided into 40 separate parts. A drawback of this practice is that these separate parts can be felt by the blind user and interfere with the accuracy of reading.

The assembled top wall may not be entirely flat and therefore may slightly undulate. A further disadvantage of the known braille display is that if the tactile members of the braille cells are each in the first outer position the distance between a free top of a tactile member and the outer surface of the top wall may vary from tactile member to tactile member. Similarly, if the tactile members of the braille cells are each in the second position, the distance between the top of the tactile member and the outer surface of the top wall may vary from tactile member to tactile member. This variation is caused by said undulated outer surface of the top wall. For a braille display it is for example, required that if the tactile member is in the first position the free top of the tactile member is the same height as the outer surface of the top wall. In other words, in that case a visually handicapped person can not feel this tactile member because it is within the associated hole of the top wall. However, it may happen, due to the undulated character of the outer surface of the top wall that a tactile member when it is in the first outer position, extends a little bit out of the associated hole. This can be very confusing for a person who is reading the braille display because in that case it is more difficult to distinguish between a tactile member which is in its outer first position and a tactile which is in its outer second position.

The object of the invention is to provide a braille display wherein the indicated problems can be overcome. A braille display according to the invention is characterised in that each braille cell is attached to the outer wall by means of a connection which acts on the one hand on the braille cell and on the other hand on the outer wall at a location adjacent the braille cell. Because each braille cell is attached to the outer wall it is no longer necessary to interconnect the braille cells to each other by means of the threaded ends and the nuts. This means that the first and second openings may be deleted and the braille cells can be more compact. Moreover because each braille cell is attached to the outer wall by means of a connection which acts on the one hand on the braille cell and on the other hand on the outer wall at a location adjacent the braille cell, each braille cell can be in the same position relative to the outer surface of the outer wall. In case the outer surface of the outer wall would undulate, the braille cells would simply follow the shape of the outer surface so that if the tactile members are each in the first outer position, the distances between the top of the outset members on the one hand and the outer surface on the other hand are the same. The same applies mutatis mutandis if each of the tactile members of the braille cells are in the second outer position.

A further advantage of a braille display according to the invention is that the solution to the problem as posed is relatively cheap. A more straight forward solution to one of the problems would have been to make sure that the outer surface of the outer wall is completely flat. This may be very costly for such an outer wall. The outer wall can no longer be made from relatively thin plastic material but instead should be made from relatively thick plastic material or from a metal. In case of a metal housing one can expect problems with moisture (condensation) and temperature (cold to touch). In each case the outer wall and thereby the braille display would become relatively expensive.

Preferably it holds that each braille cell comprises a plurality of tactile members which are arranged in a regular pattern relative to each other.

In such a manner each braille cell may be arranged to selectively form one braille character from a plurality of braille characters by means of its tactile members. According to a very practical embodiment, the regular pattern of holes and the tactile members extending through these holes form at least one braille reading line. Preferably it holds that each braille cell is attached directly to the outer wall. The need for regular servicing of the individual braille cells preferably requires that the connection between the braille cells and the outer wall not to be permanent. It is possible that each braille cell is attached directly to the outer wall by means of a snap-fit connection. This makes the assembly of the braille display fairly easy and provides a direct connection between the Braille and the outer wall. Also such a snap-fit connection may provide a non-permanent connection as discussed above.

In an alternative embodiment the outer wall is provided with a base body and an intermediate body wherein each braille cell is attached to the intermediate body which is located between the braille cell and the base body wherein the intermediate body is attached to the base body. The inner surface of the outer wall may be formed by an inner surface of the base body and an inner surface of the intermediate body. The portion of the inner surface of the main body which is not covered by the intermediate body may form part of the inner surface of the outer wall. It may be that each braille cell lies in direct contact with the inner surface of the intermediate body.

It is possible that each braille cell is directly attached to the intermediate body by means of a snap-fit connection. Also such a snap-fit connection may provide a non-permanent connection as discussed above.

Preferably it holds that intermediate body is provided with a plurality of holes wherein the tactile members from one at the same braille cell extend through one and the same hole of the intermediate body if each of these tactile members is in the second position.

In that case it preferably holds that each hole in the intermediate body is associated with only one braille cell so that through each hole in the intermediate body the tactile members of only one braille cell can extend. The holes of the intermediate body correspond with said holes of the outer wall.

Preferably the intermediate body is in the form of a strip. More advantageously the strip is a metal strip. The strip may lie directly against the inner surface of the main body. Preferably the strip is glued to the inner surface of the main body. It is also possible that the strip is provided with openings through which protrusions of the main body extend to clamp the strip at the outer wall to each other. Preferably, the strip is provided with a longitudinal base portion and two upwardly extending longitudinal legs so that the strip has a U-shaped cross section wherein the braille cell is clamped between the legs. In this way a snap-fit connection between the braille cell and the strip is obtained. Also such a snap-fit connection may provide a non-permanent connection as discussed above. Preferably, in that case intermediate body is provided with a plurality of holes wherein the tactile members from one at the same braille cell extend through one and the same hole of the intermediate body if each of these tactile members is in the second position.

According to a very special embodiment the braille display is provided with a plurality of intermediate bodies wherein to each intermediate body a plurality of braille cells are attached.

In that way, if the pattern of the holes is not entirely regular, this can be compensated by using a plurality of intermediate bodies, because each intermediate body can then by aligned with the associated holes in the outer wall.

Preferably the above referred to connection is such that each braille cell of the group of braille cells can be detached from the outer wall, for example for service and can subsequently be reattached to the outer wall by means of the connection. In that case the connection can be reused. This can be easily arranged by the mentioned snap-fit connection.

With reference to the drawings, some possible embodiments of the invention will now be discussed wherein:

FIG. 4a shows in detail a portion of FIG. 3a;

FIG. 5a shows the top wall and braille cell of FIG. 2 just before they are attached to each other;

FIG. 5b shows a cross section of the top wall and the braille cell shown in FIG. 5a;

FIG. 6b shows a cross section of the top wall and the braille cell of FIG. 6a;

FIG. 7b shows a plurality of braille cells which are attached to the top wall shown in FIG. 7a.

Figure 1:
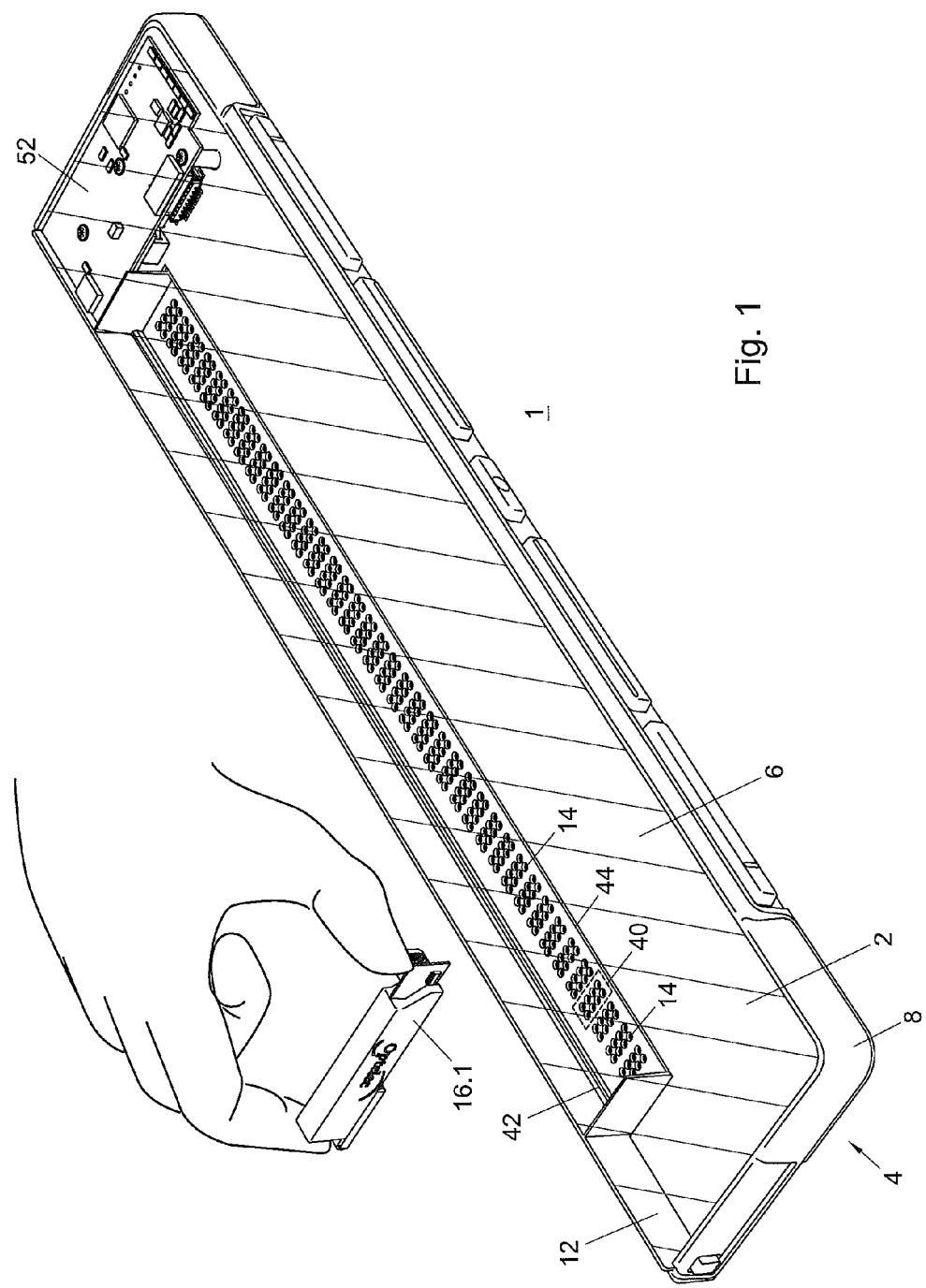
FIG. 1 shows a possible embodiment of a braille cell of a first embodiment of a braille display according to the invention.

In FIG. 1 a portion of a braille display 1 comprises an outer wall 2 comprising an outer surface 4 and an inner surface 6. The braille display further comprises upstanding side walls 8 wherein in this example the outer wall 2 and the upstanding side walls 8 are integrated in a first housing part 10 and the outer wall 2 forms part of a housing of the braille display. In this example, the outer wall forms also part of an outer top wall of the braille display. The braille display is also provided with a second housing part which forms a bottom wall 12 for closing the first housing part 10. This bottom wall is schematically shown in shaded form.

The outer wall 2 comprises a plurality of holes 14 extending between the outer surface 2 and the inner surface 6. The holes 14 are positioned in an at least substantially regular pattern relative to each other.

The braille display is further provided with a plurality of braille cells $16.i$ (i=1-40). In this example, only braille cell 16.1 is shown. The braille cell 16.1 (see FIG. 2) is provided with a plurality of tactile members $18.j$ (j=1, 2, . . . 8). Each tactile member is moveable between a first outer position 20 as shown for tactile member 18.1, and a second outer position 22 as shown for tactile member 18.5.

Each braille cell is further provided with activation means (not shown) for moving each tactile member between each first and second outer position. The activation means are in this example located within a housing 24 of the braille display. Hence each braille cell is provided with a housing, comprising the activation means wherein the at least one tactile member of each braille cell extends away from its housing.

Furthermore, each tactile member is provided with a free top 26 which, in this example, is indicated for tactile member 18.3.

In this example, each braille cell $16.i$ is provided with a metallic sub housing 28 provided with a plurality of holes 30 through which the tactile members $18.j$ extend. The metallic sub housing is provided with two opposing side walls which may be flexed towards each other as indicated by the arrows 36, 38. Hence, the side walls can be spring-loaded if the side walls are flexed towards each other.

Figure 2:
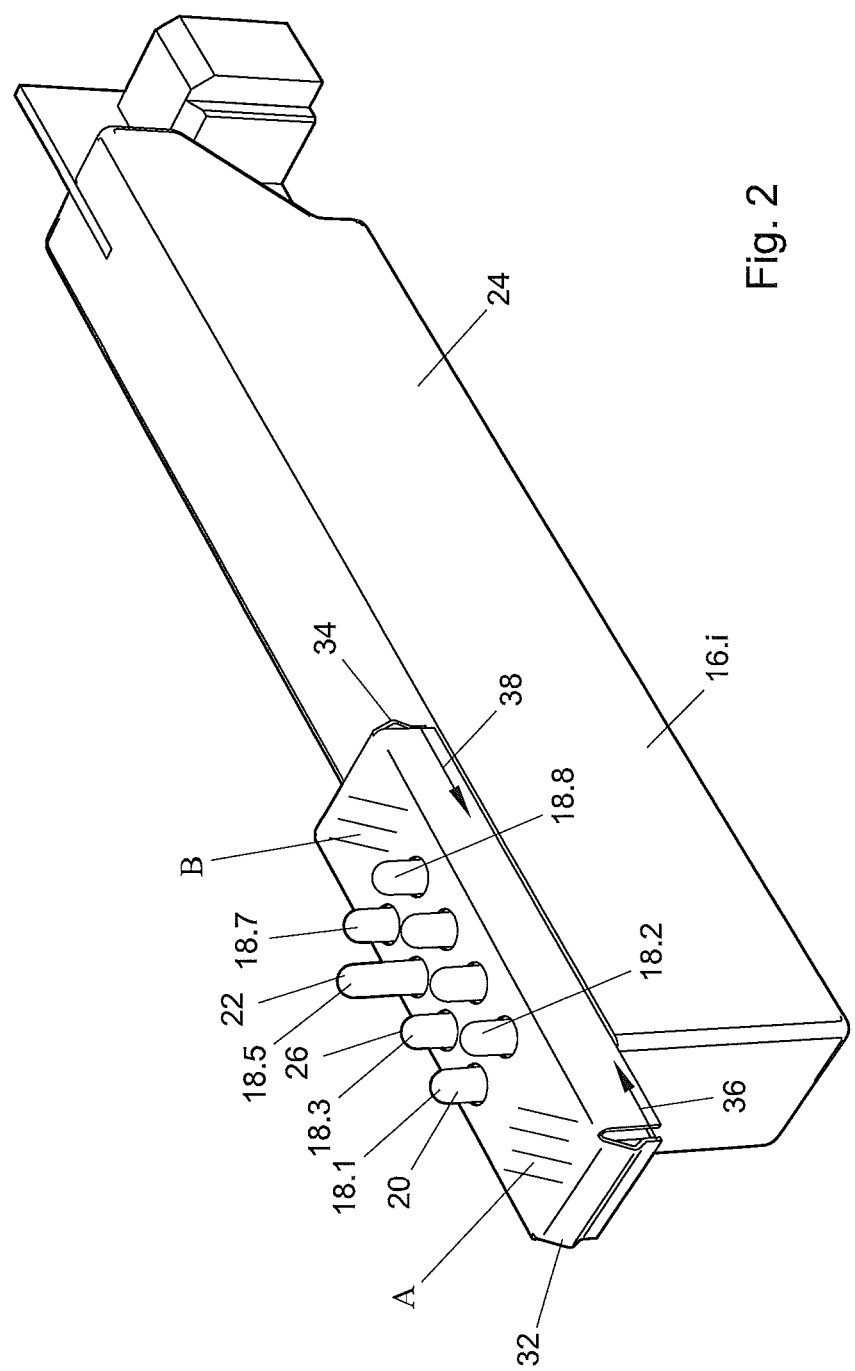
FIG. 2 shows an outer wall and upstanding side walls as well as a braille cell of a braille display according to the invention during manufacturing.

As will be apparent from FIGS. 1 and 2, the plurality of holes 14 can be subdivided in groups of 8 holes wherein each group of eight holes corresponds with the tactile members of one braille cell. One such a group is indicated with reference number 40 in FIG. 1.

In this example, there are 40 of such groups.

The outer wall 2 is further provided with a first internal edge 42 and a second internal edge 44. Each edge is provided with a grooved portion 46. Furthermore, each side wall 32, 34 comprises a toothed portion 48.

Figure 5B:
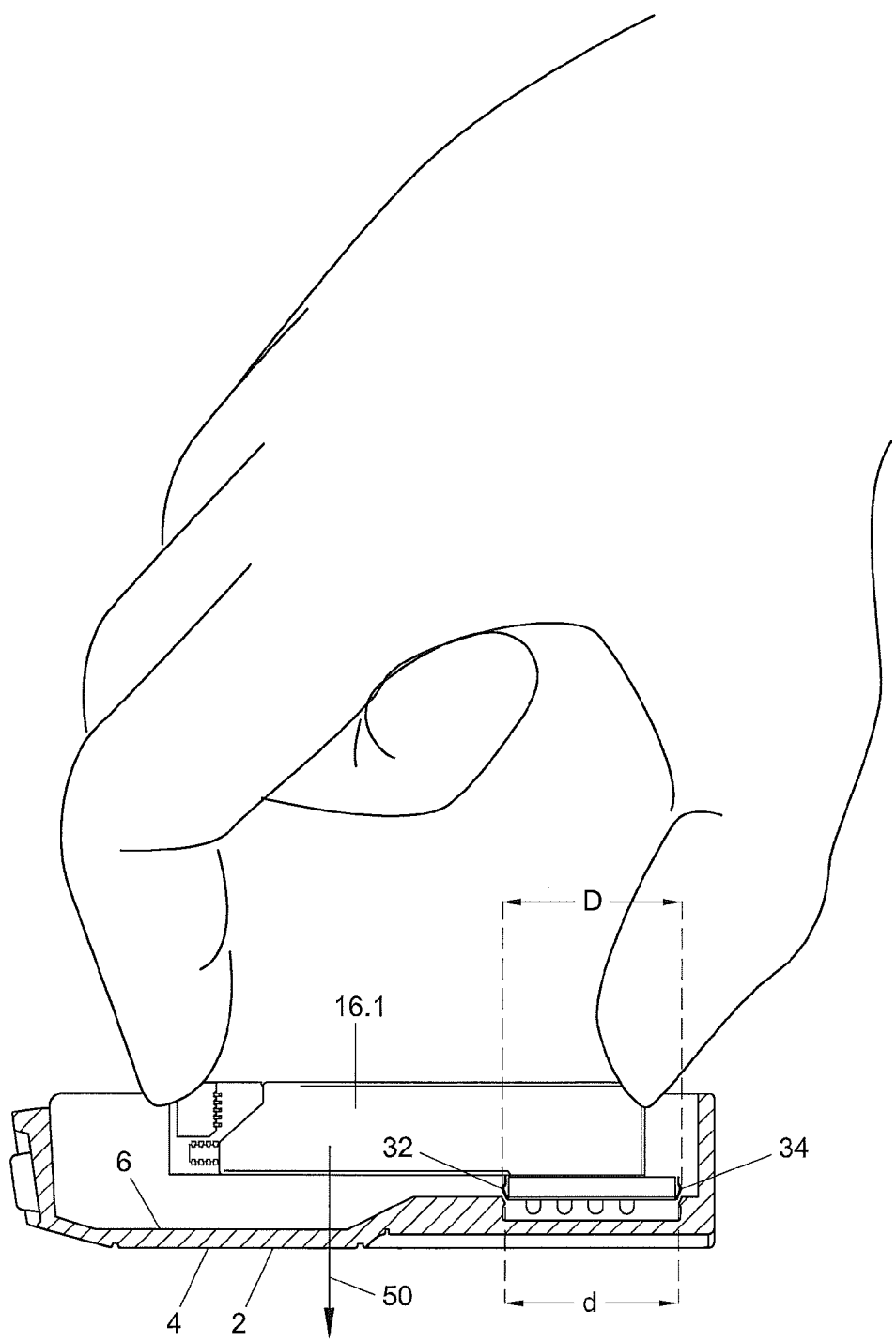
Figure 6A:
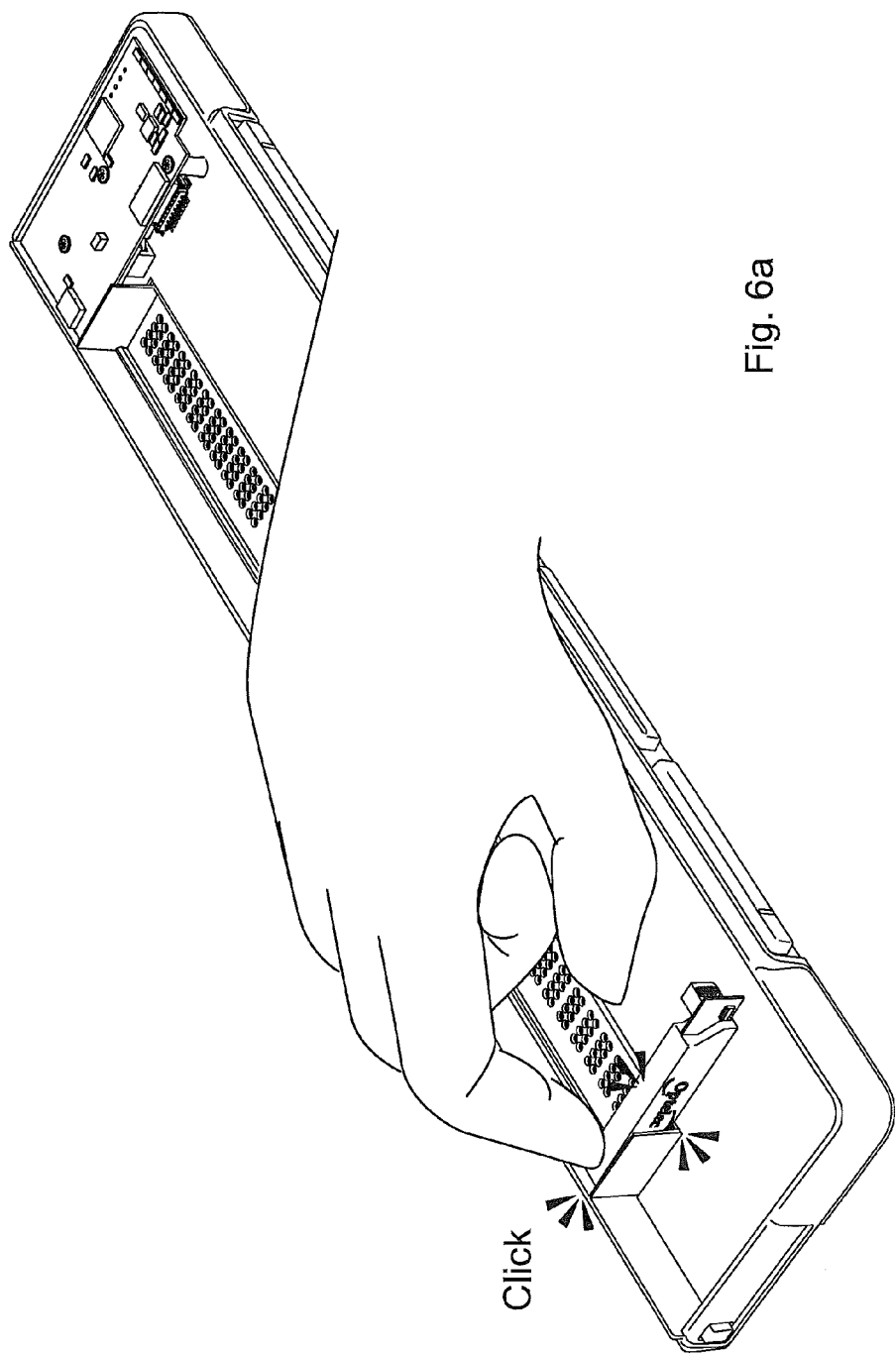
FIG. 6a shows the braille cell and the top wall of FIG. 1 when they are assembled.

In order to mount the braille cell 16.1 into the braille display, the braille cell 16.1 is brought into the vicinity of the first group of holes 50 (see FIGS. 5a and 5b). As can be seen in FIG. 5b, the largest distance D between the opposite side walls 32, 34 of the braille cell 16.1 is larger than the smallest distance d between the opposing edges 42, 44 of the outer wall 2. By lowering the braille cell 16.1 in the direction 50, the side walls 32, 34 can flex towards each other so that the distance D becomes smaller if these side walls contact the edges 42, 44. The grooved portions 46, 48 of the opposed edges 42, 44 provide a snap-fit connection with the opposed toothed portions 48, 50 of the opposing side walls 32, 34. Hence, by moving the braille cell 16.1 in the direction 50, the toothed portions 48 will snap into the grooved portions 46. This situation is shown in FIGS. 6a and 6b. In that situation, the tactile members 18.j of the braille cell 16.1 each extend through one of the holes 14 of the group of holes 50. If the tactile members are in the first position, the tactile members do not extend out of the holes 14. If the tactile member is in a second outer position, the tactile member will extend out of the hole.

It holds that for each braille cell of the group of the braille cells it holds that each tactile member extends through one of the holes from the inner surface in a direction of the outer surface, if the tactile member is in its first position and if the tactile member is in its second position.

In this example it also holds that for each braille cell of the group of the braille cells it holds that a distance between the free top of the tactile member and the outer surface if the tactile member is in its first position differs from the distance between the free top of the tactical member and the outer surface if the tactile member is in its second position.

If the tactile member extends out of its associated hole, as shown for one tactile member in FIG. 6b, the distance is defined to be a positive distance. In case the top of the tactile member lies on the same level as the outer surface 2, the distance h is said to be zero. This may be the case if the tactile member is in its first position. It may, however, also be that if the tactile member is in its first position, the distance between the tactile member is defined to be negative as indicated by h'. In other words, if the distance between a free top of a first tactile member and the outer surface differs from the distance between a free top of a second tactile member and the outer surface, the position of these free tops relative to the outer surface differ relative to each other.

In this example each braille cell is provided with eight tactile members. These tactile members are arranged in a regular pattern relative to each other. Each braille cell is therefore arranged to selectively form one braille character from a plurality of braille characters by means of its tactile members. Each braille cell is arranged to form only one character at one time.

Subsequently other braille cells 16.2-19.39 may be attached to the outer wall in a similar manner as discussed for braille cell 16.1. It holds therefore that each braille cell is attached directly to the outer wall by means of a connection which acts on the one hand on the braille cell and on the other hand on the outer wall at a location adjacent to the braille cell.

It further holds that each braille cell lies in direct contact with the inner surface of the outer wall. It further holds that each braille cell is attached directly to the outer wall by means of a snap-fit connection. This connection is such that each braille cell of the group of braille cells can be detached from the outer wall, for example for service and can subsequently be reattached to the outer wall by means of the connection.

It is also possible that each braille cell is glued directly to the inner surface of the outer wall. In that case, the snap-fit connection may be omitted. It is also possible that each braille cell is attached to the inner surface of the outer wall by means of a double sided adhesive tape. The tape can extend, for example, on the areas A, B as shown in FIG. 2.

After that each of the 40 braille cells 16.1-16.40 are attached to the outer wall, and further electronics 52 is inserted into the first housing part 10 whereby each of the braille cells 16.i are electrically connected with the electronics, the braille display may be closed by means of the bottom wall 12.

In this example, the outer wall forms part of the housing of the braille display. It also holds that the outer wall forms part of the outer top wall of the braille display. The braille display is in this example a unit which lies in a horizontal plane similarly as a keyboard of a computer, wherein a visually handicapped person may read the braille reading line.

It is however also possible that the braille display comprises a plurality of braille reading lines or that the braille display comprises a plurality of braille cells which are arranged in rows and columns relative to each other so that its tactile members form a two-dimensional array of tactile members, for example, 500 by 500 tactile members for providing a braille display which is suitable for forming a picture. In that case, each braille cell may, for example, still be comprises of eight tactile members.

It also holds in this example that each braille cell is attached individually to the outer wall. It is also possible that, for example, only the braille cells 16.1, 16.3, 16.5, . . . 16.39 are individually attached to the outer wall as discussed above and that the remaining braille cells 16.2, 16.4, . . . 16.40 are attached to the braille cells which are individually attached to the outer wall. For example, in that case, braille cell 16.2 may be attached to braille cells 16.1 and 16.3 by means of glue, adhesive tape and/or other type of connections.

Figure 3A:
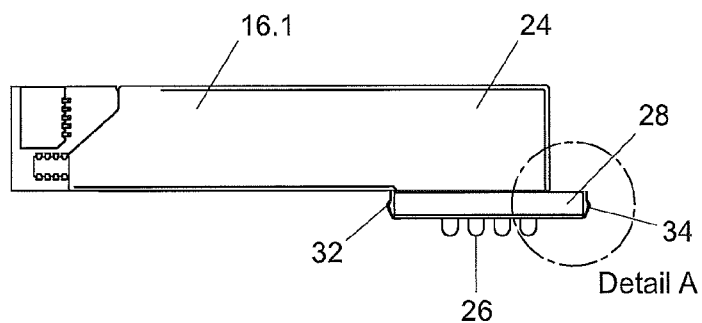
FIG. 3a shows the braille cell of FIG. 1.
Figure 3B:
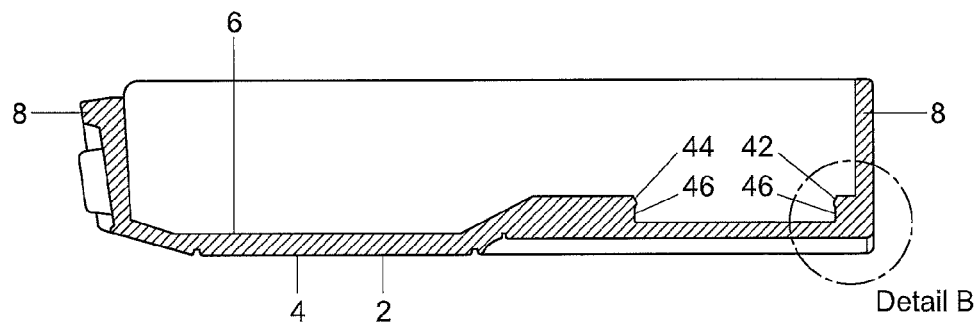
FIG. 3b shows a cross section of the top wall and outer side walls of the braille display according to FIG. 2.
Figure 4A:
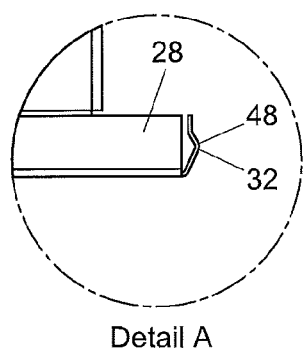
Figure 4B:
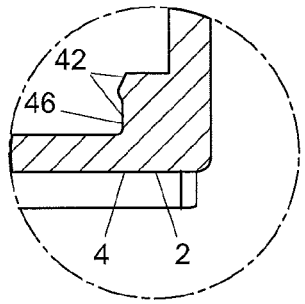
FIG. 4b shows in detail a portion of FIG. 3b.
Figure 7A:
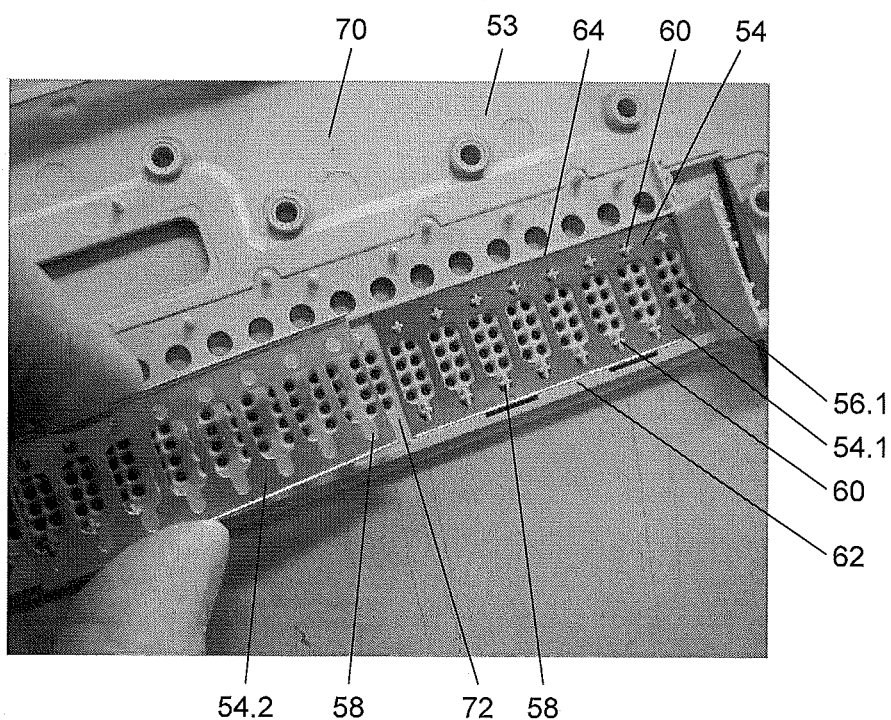
FIG. 7a shows an alternative embodiment of the top wall.
Figure 7B:
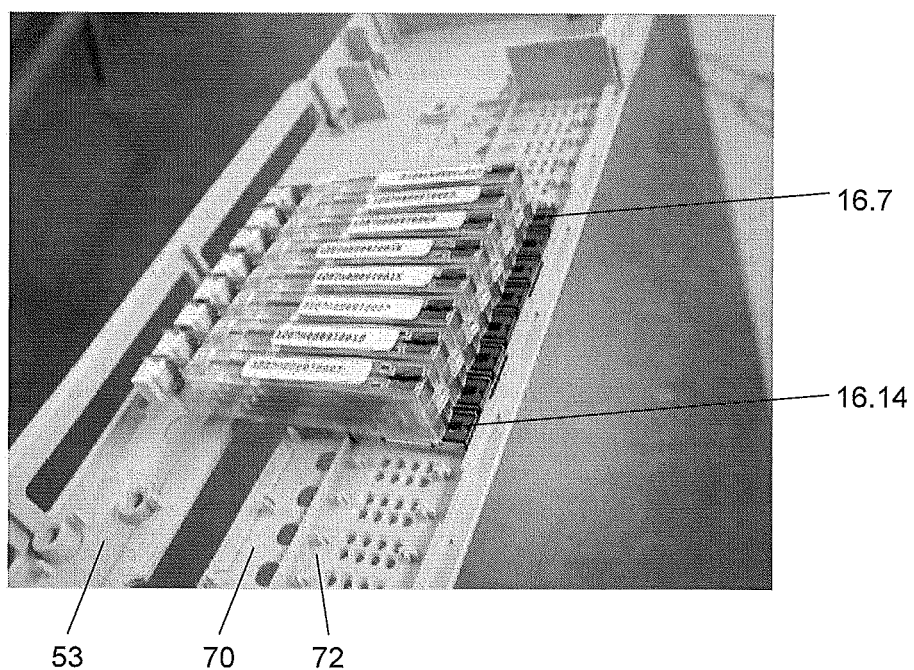

It is also possible that the outer wall is formed by a main body 53 and an intermediate body 54 which are attached to each other. In that case each braille cell is attached to the intermediate body. The intermediate body 54 is attached to the main body. An example is shown in FIGS. 7a and 7b. In this example the intermediate body is in the form of a strip 54.1. Each strip comprises eight holes 56.i (i=1, 2, . . . 8) wherein the tactile members from one and the same braille cell may extend through one and the same hole. In other words, each hole 56 is associated with one braille cell. The strip 54 is in this example a metal strip. The strip 54 lies directly against an inner surface 72 of the main body. The portion 70 of the inner surface of the main body which is not covered by the intermediate body 54 forms part of the inner surface of the outer wall. The strip is in this example provided with a plurality of openings 58 through which protrusions 60 (in this example having the shape of a cross) of the main body 1 extend to clamp the strip and main body to each other. In addition or alternatively, it may be that the strip is glued to the inner surface of the main body. This also provides direct attachment of the strip to the main body. It is also possible that the strip is attached to the inner surface by means of adhesive tape. The strip 54 is provided with upstanding edge portions 62, 64 having a shape corresponding with the edges 42 and 44, comprises the grooved portions 46 as discussed with reference to FIGS. 1-6. If the strip 54.1 is attached to main body 53 as shown in FIG. 7a, a similar strip 54.2 can be attached adjacent the strip 54.1. In FIG. 7b it is shown how the strip 54.2 is attached wherein strip 54.1 is omitted. As shown, subsequently the braille cells 16.7-16.14 can be directly attached to the strip by a snap-fit connection as discussed for FIGS. 1-6. In other words, the combination of the strip 54.2 and the main body provides a similar profile and shape to the outer wall 2 at the location of the strip as is discussed and shown in FIG. 3*b*.

In this example five strips each comprising eight holes 56., are attached to the main body 53. The reason for this is that experience learns that the pattern of the holes in the outer wall may not be completely regular due to temperature fluctuations during the manufacturing process of the outer wall. Preferably, the outer wall is manufactured by injection moulding wherein depending on the position wherein the plastic material is injected into the mould a temperature profile may occur which results in a slight deviation of the regular pattern of the holes. Such a deviation will generally not be present in the strip if the intermediate body would consist of one strip comprises 39 holes and a plurality of said openings 58 it may be that this strip does not fit precisely. In other words, the position of the protrusions on the one hand and the openings on the other hand do not fully match. The same applies to the positions of the holes 14 on the one hand and the position of the holes 56 on the other hand. This problem can be avoided by using multiple strips each of which can be easily attached to the outer wall with slight regular positioning of the strips relative to each other may compensate for the slightly irregular pattern of the holes 4 and the protrusions 60 in the outer wall.

The present invention is not limited to the above referred to embodiments. In this example, the braille cells are directly attached to the strips by means of said snap-fit connection. In that case, each braille cell lies in direct contact with the intermediate body. It is also possible that each braille cell is glued directly to the intermediate body. It is also possible that each braille cell is attached to the intermediate body by means of double sided adhesive tape. Such varieties all fall within the scope of the appended claims.

The invention claimed is:

1. A braille display having an undivided outer wall with a flat outer surface, an inner surface and a plurality of holes extending between the outer surface and the inner surface and which are arranged in an at least substantially regular pattern relative to each other, wherein the braille display is further provided with individual, removable braille cells, each braille cell consists of an integrated housing with an outer wall, a bottom wall and side walls and a sub-housing with a plurality of tactile members each being secured in said sub-housing and movable between a first outer position and second outer position, wherein for each braille cell, a distance as measured in a longitudinal direction of the tactile member between the free top of the tactile member and the outer surface if the tactile member is in the first outer position differs from the distance as measured in a longitudinal direction of the tactile member between the free top of the tactical member and the outer surface if the tactile member is in the second outer position, the inner surface of the outer wall having a first and second longitudinal edge extending parallel to each other wherein each of the braille cells is clamped between the edges, the sub-housing having opposing end side walls flexible for movement towards each other for cooperation with a respective grooved portion of the first and second longitudinal edges of the outer wall for a snap-fit connection and retention in a manner that allows removal and alignment of a tactile member with a respective hole; each of said tactile members extends away from the sub-housing and is movable between the first and second outer position wherein each tactile member comprises a free top and wherein the sub-housing of each individual braille cell is attached directly to only a portion of the outer top wall by the snap-fit connection with the respective grooved portions, wherein each tactile member extends through one of the holes from the inner surface in a direction of the outer surface, when the tactile member is in the second outer position and wherein a position of the free top of the tactile member relative to the outer surface when the tactile member is in the first outer position differs from the position of the free top of the tactical member relative to the outer surface when the tactile member is in the second outer position, and each braille cell is individually attached to the outer wall and defines at least one braille character.

2. A braille display according to claim 1, characterized in that, for each braille cell of the group of the braille cells each tactile member extends through one of the holes from the inner surface in a direction of the outer surface, if the tactile member is in the first outer position and if the tactile member is in the second outer position.

3. A braille display according to claim 1, characterized in that each braille cell comprises a plurality of tactile members which are arranged in a regular pattern relative to each other.

4. A braille display according to claim 3, characterized in that each braille cell is arranged to selectively form one braille character from a plurality of braille characters by means of the tactile member.

5. A braille display according to claim 4, characterized in that by means of each braille cell one character can be formed at one time.

6. A braille display according to claim 1, characterized in that the holes and the tactile members extending through the holes form at least one braille reading line.

7. A braille display according to claim 1, characterized in that each braille cell of the group of the braille cells lies in direct contact with the inner surface of the outer wall.

8. A braille display according to claim 1, characterized in that the braille cell is provided with at least one spring member for providing a clamping force between the edges and the braille cell.

9. A braille display according to claim 1, characterized in that the outer wall is provided with a base body and an intermediate body wherein each braille cell of the group of the braille cells is attached to the intermediate body which is located between the braille cell and the base body wherein the intermediate body is attached to the base body.

10. A braille display according to claim 9, characterized in that each braille cell of the group of the braille cells lies in direct contact with the intermediate body.

11. A braille display according to claim 9, characterized in that each braille cell comprises a plurality of tactile members which are arranged in a regular pattern relative to each other wherein the intermediate body comprises a plurality of holes wherein the tactile members from one at the same braille cell extend through one and the same hole of the intermediate body if each of these tactile members is in the second outer position.

12. A braille display according to claim 11, characterized in that each hole in the intermediate body is associated with only one braille cell so that through each hole in the intermediate body the tactile members of only one braille cell can extend.

13. A braille display according to claim 9, characterized in that the intermediate body is in the form of a strip.

14. A braille display according to claim 13, characterized in that the strip is a metal strip.

15. A braille display according to claim 14, characterized in that the strip lies directly against an inner surface of the base body.

16. A braille display according to claim 14, characterized, in that the strip is attached to the inner surface of the bases body by means of adhesive tape.

17. A braille display according to claim 15, characterized in that the strip is attached directly to the inner surface of the base body by means of glue.

18. A braille display according to claim 13, characterized in that the strip is provided with openings through which protrusions of the base body extend to clamp the strip and the base body to each other.

19. A braille display according to claim 13, characterized in that the holes and the tactile members extending through the holes form at least one braille reading line wherein a longitudinal direction of the at least one braille reading line extends in a longitudinal direction of the strip.

20. A braille display according to claim 13, characterized in that the strip is provided with a longitudinal base portion and two upwardly extending longitudinal legs so that the strip has a U-shaped cross section wherein the braille cell is clamped between the legs.

21. A braille display according to claim 20, characterized in that the braille cell is provided with at least one spring member for providing a clamping force between the legs and the braille cell.

22. A braille display according to claim 9, characterized in that the outer wall is provided with a plurality of intermediate bodies wherein to each intermediate body a plurality of braille cells are attached.

23. A braille display according to claim 22, characterized in that the holes and the tactile members extending through the holes form at least one braille reading line wherein each braille reading line is associated with a plurality of intermediate bodies.

24. A braille display according to claim 1, characterized in that the outer wall forms part of a housing of the braille display.

25. A braille display according to claim 1, characterized in that the outer wall forms part of an outer top wall of the braille display.

* * * * *